(12) United States Patent
Gehm et al.

(10) Patent No.: US 10,492,460 B1
(45) Date of Patent: Dec. 3, 2019

(54) PULSATION SYSTEM

(71) Applicants: Lanny Gehm, Lisle, NY (US); William Gehm, Lisle, NY (US)

(72) Inventors: Lanny Gehm, Lisle, NY (US); William Gehm, Lisle, NY (US)

( * ) Notice: Subject to any disclaimer, the term of this patent is extended or adjusted under 35 U.S.C. 154(b) by 0 days.

(21) Appl. No.: 16/046,819

(22) Filed: Jul. 26, 2018

(51) Int. Cl.
*A01J 5/04* (2006.01)
*A01J 5/10* (2006.01)
*A01J 5/007* (2006.01)

(52) U.S. Cl.
CPC ........ *A01J 5/10* (2013.01); *A01J 5/007* (2013.01)

(58) Field of Classification Search
CPC .......... A01J 5/048; A01J 5/007; A01J 5/0175; A01J 5/16; A01J 5/10; A01J 5/14
USPC ........... 119/14.28, 14.29, 14.3, 14.31, 14.32, 119/14.34, 14.35, 14.37
See application file for complete search history.

(56) References Cited

U.S. PATENT DOCUMENTS

| | | | |
|---|---|---|---|
| 1,355,839 A | 10/1920 | Mehring | |
| 1,858,266 A | 5/1932 | Dinesen | |
| 2,017,754 A | 10/1935 | Hodson | |
| 2,646,058 A | 7/1953 | Thomas | |
| 4,011,838 A | 3/1977 | Nordegren et al. | |
| 5,697,325 A | 12/1997 | Gehm et al. | |
| 2008/0067461 A1* | 3/2008 | Petersen | F16K 31/0689 251/129.15 |
| 2011/0168098 A1* | 7/2011 | Gehm | A01J 5/14 119/14.25 |
| 2012/0312237 A1 | 12/2012 | Hansen et al. | |
| 2013/0263788 A1 | 10/2013 | Buck et al. | |
| 2017/0000075 A1 | 1/2017 | Johansson | |
| 2018/0020633 A1 | 1/2018 | Gehm et al. | |

* cited by examiner

*Primary Examiner* — Trinh T Nguyen
(74) *Attorney, Agent, or Firm* — Brown & Michaels, PC

(57) ABSTRACT

There is provided a method for improving the reliability and performance of a valve device that transitions between the pressure and vacuum phases for the purpose of milking animals. The improvement properly biases the movable parts and reduces physical wear of the movable parts within the valve device while ensuring proper function of said movable parts.

5 Claims, 2 Drawing Sheets

PULSATION SYSTEM

BACKGROUND OF THE INVENTION

Field of the Invention

The present invention pertains to an improvement of a milking system for domesticated animals and, more particularly to a milking system with two independent valves for alternating between the pressurizing and vacuum cycles of the teat cup, as well as electronic controls for independently actuating the atmospheric pressure and vacuum cycles.

Description of Related Art

Typical milking systems apply periodic alternating pressure to the teat cup of a milking apparatus. This results in the removal and the flow of milk from the udder to which the teat cup is applied. The alternating pressure between the atmospheric pressure and vacuum cycles is controlled by a two-way valve combination that feeds a pulsation chamber. Conventional pulsator designs incorporate a sealing feature at both ends of the valve to provide proper function for minimizing air or vacuum leakage. This valving apparatus is commonly referred to as a pulsator.

The typical milking system integrates the pulsator with a teat cup and claw. The teat cup contains an inflatable liner that, when alternately pressurized and depressurized, causes the udder to release its milk. The milk then flows into the claw, which comprises a hollow chamber that serves as the collection unit for a plurality of teat cups or into a hose and a receiving container in the case of robotic milking systems. Milk gathered by the claw is then transported to a series of hoses and pipes, terminating at a storage tank.

U.S. Pat. No. 5,697,325 discloses a milking system including a valve design with controlling electronics to solve known milking performance problems with conventional milking systems. The milking system of U.S. Pat. No. 5,697,325 features two independent solenoids for control of vacuum and atmospheric pressure. The solenoid valve plunger in each of the two independent solenoids moves up and down in the center of the solenoid and has a seal at only one end to minimize air or vacuum leakage when in the closed position. The other end of the valve plunger is rigid and ideally has a tapered end for maximum magnetic strength to aid in lifting the valve plunger.

The typical conventional pulsator incorporates solenoid valves with valve plungers that have seals at each end. A seal is required at each end to enable those designs to control air or vacuum at each end instead of only at one end for the milking system in U.S. Pat. No. 5,697,325.

The rigid end feature of the milking system described in U.S. Pat. No. 5,697,325 causes physical wear of the impacting surfaces of the solenoid valve plunger and the interior surface of the solenoid against which the valve plunger contacts at the end of its travel. This impact also creates unnecessary noise and structural shock/stress. The free-fall characteristic with a seal at the bottom end can also cause the plunger to bounce upon impact thereby preventing immediate sealing action.

U.S. Pat. No. 4,011,838 describes a conventional pulsator design that incorporates a spring feature at one end of the solenoid valve plunger. The device described in that patent states that the purpose of the spring is to close an aperture with the valve plunger. Springs are known to be used in prior art for solenoid valves in other industries to provide a biasing means against a force impeding the movement of the valve plunger. The valve plunger utilized in the pulsator described in U.S. Pat. No. 5,697,325 utilizes the force of gravity to move the plunger as there is no biasing force to impede the movement of the valve plunger as is the case in other solenoid valves. A spring does not exhibit damping qualities and therefore can also permit a bouncing action upon impact of the solenoid at the end of travel. This is the basic reason for automobile suspension systems having both a spring and a damper (shock absorber) to eliminate bounce.

US Patent Application Publication US2018/0020633A1 describes a two-valve pulsator with a flexible seal applied to one end of the solenoid to prevent the passage of air or vacuum. That flexible seal will also reduce the impact of the valve plunger however it will not provide the dampening action of the present invention. The flexible seal lacks the range of motion of the present invention and will not provide a dampening action to prevent oscillation (bounce) of the valve plunger.

The present invention improves the design of the two-valve pulsator by adding a elastomer damping member between the two rigid surfaces of the solenoid valve plunger and the solenoid. The elastomer damping member uniquely provides a damping action at both ends of the plunger travel using a single elastomer damping member.

SUMMARY OF THE INVENTION

An improved milking system that features an elastomer damping means of controlling travel of a solenoid valve plunger. The system comprises a two-valve control that provides a sharp transition between the alternating air pressure and vacuum that are supplied to a teat cup. One valve of the pulsator mechanism controls the vacuum inlet; the other valve controls the atmospheric air inlet. Each valve device has a seal at one end and an elastomer damping member between the valve device and the solenoid valve face. The elastomer damping material provides a means of reducing the impact, associated noise and mechanical oscillation (bounce) of the plunger.

DETAILED DESCRIPTION OF THE INVENTION

The invention pertains to a milking system having a pulsator unit that has separate pressure and vacuum channels. Each channel is controlled by its own respective valve. The first valve of channel A controls the vacuum inlet, controlling the supply of a vacuum to a teat-cup of a milking apparatus. The second valve of channel B controls the atmospheric air inlet and air pressure to a teat cup of a milking apparatus. The electronics actuating the valves creates a sharp transition in the pulsator outlet between the atmospheric air and the vacuum, so that the vacuum and atmospheric air sources are never simultaneously connected.

Figure 1:
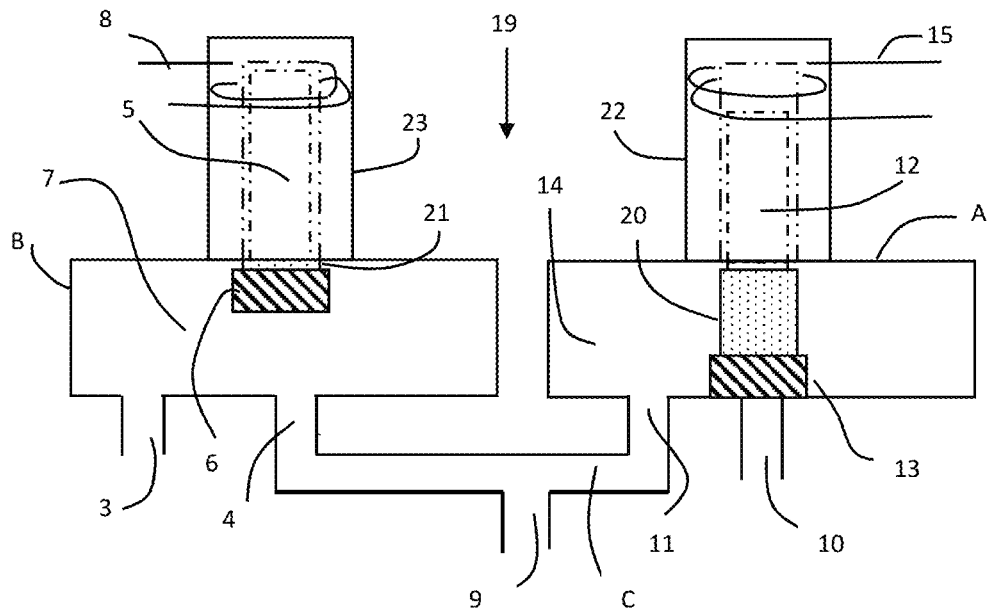
FIG. 1 shows a schematic diagram of the pulsation apparatus of this invention.

Referring to FIG. 1, a pulsator 19 includes three channels, A, B and C, with channel A controlling the vacuum inlet 10, and channel B controlling the atmospheric air pressure inlet 3. Channel A has a chamber 14, and channel B has a chamber 7 Chamber 14 has a vacuum pressure outlet 11 and a vacuum pressure inlet 10 Chamber 7 comprises an atmospheric air pressure outlet 4 and an atmospheric air pressure inlet 3.

Received within chamber 14 of channel A and solenoid housing 22 is an elastomer damping member 20 and a solenoid valve plunger 12, forming a first valve. An end of the solenoid valve plunger 12 has a seal 13 and is biased against vacuum pressure inlet 10 in chamber 14. A solenoid coil 15 is powered to move the solenoid valve plunger 12 against its biasing, in order to open vacuum pressure inlet 10. The elastomer damping member 20 has an uncompressed height similar to the distance the plunger 12 travels when fully extended from the solenoid housing 22 in order to provide a proper damping function when seal 13 and plunger 12 impact the base of chamber 14. Furthermore, elastomer damping member 20 must be capable of being compressed a substantial percentage of the total uncompressed height so that plunger 12 can fully retract within solenoid 22.

Received within chamber 7 of channel B and solenoid housing 23 is a elastomer damping member 21 and a solenoid valve plunger 5, forming a second valve. An end of the solenoid valve plunger 5 has a seal 6 and is biased against atmospheric air pressure outlet 4. A solenoid coil 8 is powered to move the solenoid valve plunger 5 against its biasing, in order to open atmospheric air pressure outlet 4. The atmospheric air pressure outlets 4 and vacuum pressure outlet 11 open upon third channel (channel C), having outlet 9 to the pulsation chamber (not shown).

Figure 3:
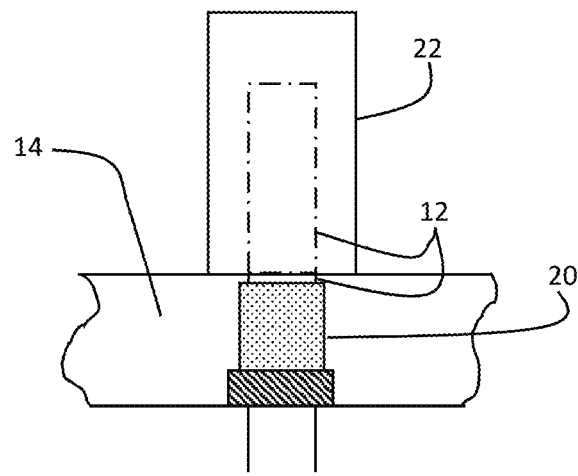
FIG. 3 illustrates a schematic diagram of the elastomer damping member of the present invention in the uncompressed state.

Referring to FIG. 3, a detailed partial section of chamber 14 with solenoid housing 22 and plunger 12 with elastomer damping member 20 is shown with the plunger 12 down in the closed state with elastomer damping member 20 fully uncompressed.

Figure 4:
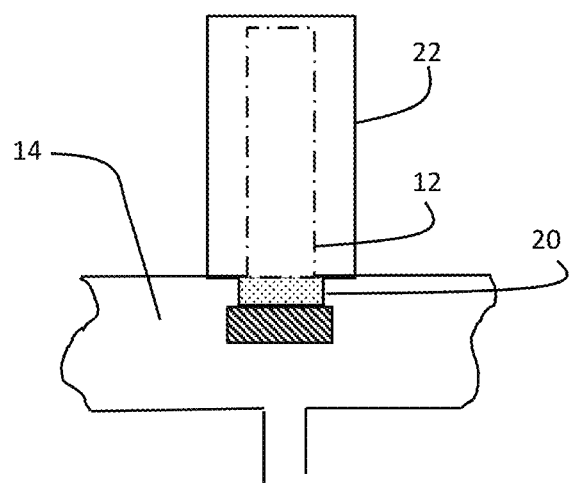
FIG. 4 illustrates a schematic diagram of the elastomer damping member of the present invention in the compressed state.

Referring to FIG. 4, a detailed partial section of chamber 14, with solenoid housing 22 with elastomer damping member 20 is shown with the plunger 12 up in the open state with elastomer damping member 20 fully compressed.

A control circuit (not shown) actuates either the solenoid valve plunger 12 biased against the vacuum pressure inlet 10 in chamber 14 or the solenoid valve plunger 5 biased against the atmospheric air pressure outlet 4 to open. The control circuit would ensure that only one of the valves is open at any one given time, i.e. only one of the respective solenoid valve plungers 5, 12 is lifted at any given time. This prevents the pulsator output 9 in channel C from being simultaneously connected to both the atmospheric air pressure inlet 3 of the channel B and the vacuum pressure inlet 10 of channel A.

The ends of the solenoid valve plungers 5, 12 that are received by the solenoid housing 22, 23 may be flat as shown in FIG. 1 or have a tapered or pointed end to allow for improved magnetic function of the solenoid.

The elastomer damping member 20, 21 may be a resilient elastomeric material that limits the impact of the solenoid valve plunger 5, 12 such as a foam material.

By providing an elastomer damping member 20, 21 between the solenoid housing 22, 23 of the pulsator and the end of solenoid valve plunger 5, 12, there is a decrease in the wear of the solenoid valve plunger 5, 12, a decrease in impact noise of the solenoid valve plunger 5, 12 with the housing 22 and a reduction in dynamic oscillation (bounce) of the plunger 5. In other words, the elastomer damping member 20, 21 is both a resilient stop and a damper for the solenoid valve plunger 5, 12. Furthermore, the elastomer damping member 20, 21 may provide stored energy to aid in moving the solenoid valve plunger 5, 12 towards the outlet 4, 10 after the elastomer damping member 20, 21 has been compressed and solenoid coil 8, 15 has been unpowered. Furthermore, the elastomer damping member 20, 21 may provide a bias to maintain seal 6, 13 in intimate contact with chamber 14 to seal air pressure outlet 4 and vacuum pressure inlet 10.

The dimensions of the elastomer damper member 20, 21 are such that the height is approximately equal to the distance the plunger 5, 12 travels.

Figure 2:
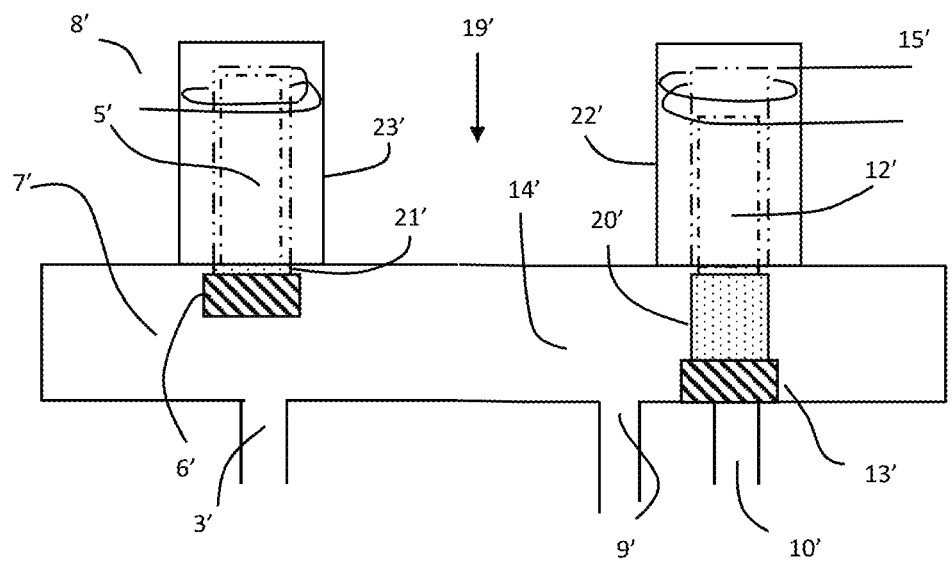
FIG. 2 illustrates a schematic diagram of an alternate embodiment of the present invention.

Now referring to FIG. 2, an alternate embodiment of the pulsator unit 19 (FIG. 1) is referred to generally as reference numeral 19'. Pulsator 19' includes a chamber 14'. Chamber 14' has a pressure outlet 9' and two pressure inlets, a vacuum pressure inlet 10' and an atmospheric air pressure inlet 3'. Received within opposite sides of the chamber 14' in solenoid housings 22' and 23' are two compressible members 20', 21' and two biased, solenoid valve plungers 12', 5' forming respective first and second valves.

An end of the solenoid valve plunger 12' has a seal 13' and is biased against vacuum pressure inlet 10' in chamber 14'. A solenoid coil 15' is actuated to move the solenoid valve plunger 12' against its biasing, in order to open vacuum pressure inlet 10'. Similarly, an end of the solenoid valve plunger 5' has a seal 6' and is biased against atmospheric air pressure inlet 3'. A solenoid coil 8' is actuated to move the solenoid valve plunger 5' against its biasing, in order to open atmospheric air pressure inlet 3'.

A control circuit (not shown) actuates either the solenoid valve plunger 12' biased against the vacuum pressure inlet 10' in chamber 14' or the solenoid valve plunger 5' biased against the atmospheric air pressure inlet 3' to open. The control circuit would ensure that only one of the valves is open at any one given time, i.e. only one of the respective solenoid valve plungers 5', 12' is lifted at any given time. This prevents the pulsator output 9' from being simultaneously connected to both the atmospheric air pressure inlet 3' and the vacuum pressure inlet 10'.

The ends of the solenoid valve plungers 5', 12' that are received by the solenoid housing 22', 23' may be flat as shown in FIG. 2 or have a tapered or pointed end to allow for improved magnetic performance.

The elastomer damping member 20', 21' may be a resilient elastomeric material that limits the impact of the solenoid valve plunger 5', 12' such a urethane foam material.

By providing an elastomer damping member 20', 21' between the solenoid housing 22', 23' of the pulsator and the solenoid valve plunger 5', 12', there is a decrease in the wear of the solenoid valve plunger 5', 12', a decrease in impact noise of the solenoid valve plunger 5', 12' with the housing 22 and a decrease in dynamic oscillation (bounce) of valve plunger 5', 12'. In other words, the elastomer damping member 20', 21' is both a resilient stop for the solenoid valve plunger 5', 12' and a damper. Furthermore, the elastomer damping member 20', 21' may provide stored energy to aid in moving the solenoid valve plunger 5', 12' towards the outlet 4', 10' after the compressible member 20', 21' has been compressed. Furthermore, the elastomer damping member 20', 21' may provide a bias to maintain seal 6', 13' in intimate contact with chamber 14' to seal air pressure inlet 3' and vacuum pressure inlet 10'.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A milking apparatus for providing pressure and vacuum phases of a pulsator mechanism, comprising:
    a pulsator comprising a first valve and a second valve, the first and second valves each comprising a channel and a solenoid housing having a first end open to the channel and a second end; a respective inlet and a respective outlet through which air pressure and vacuum can be respectively supplied to a teat-cup milking apparatus, a solenoid valve plunger reciprocally movable in the solenoid housing with a first end in the channel, the first end having a seal for sealing the inlet from the outlet and a second end in the solenoid housing opposite the first end, and a damper member between the seal on first end of the solenoid valve plunger and the solenoid housing;
    a first valve control for controlling the supply of air pressure to said teat-cup milking apparatus;
    a second valve control for controlling the supply of a vacuum to said teat-cup milking apparatus;
    a common outlet operatively connected to both of said valves through which air pressure and vacuum are alternately supplied to said teat-cup milking apparatus from said first and second valves, respectively; and
    control means connected to the solenoid of the first valve and the solenoid of the second valve, the control means respectively actuating and deactivating said first and second valve to provide alternating supply of air pressure and vacuum to said common outlet, with said first and second valve never being simultaneously actuated.

2. The milking apparatus of claim 1, wherein the damper member is a highly compressible elastomer.

3. The milking apparatus of claim 1, wherein the height of the damper member is approximately that of the distance the solenoid valve plunger travels.

4. An improved milking apparatus for providing pressure and vacuum phases of a pulsator mechanism, comprising: a pulsator comprising a first valve and a second valve, the first and second valves each having a respective inlet and a respective outlet through which air pressure and vacuum can be respectively supplied to a teat-cup milking apparatus, the first valve and second valve each having a channel and a solenoid housing having a first end in the channel and a second end; and a solenoid valve plunger reciprocally moveable in the solenoid housing with a first end in the channel, the first end having a seal for sealing the inlet from the outlet and a second end in the solenoid housing, opposite the first end; a common outlet operatively connected to both of said valves through which air pressure and vacuum are alternately supplied to said teat-cup milking apparatus from said first and second valves, respectively; and control means connected to the solenoid of the first valve and the solenoid of the second valve, the control means respectively actuating and deactivating said first valve and second valve to provide alternating supply of air pressure and vacuum to said common outlet, with said first valve and second valve controls never being simultaneously actuated, the improvement comprising:
    a highly compressible damper member between the seal on the first end of the solenoid valve plunger and the solenoid housing of the first valve and the second valve wherein the height of the damper member is approximately that of the distance the solenoid valve.

5. A milking apparatus for providing pressure and vacuum phases of a pulsator mechanism, comprising:
    a pulsator comprising a first valve and a second valve, the first and second valves each having a solenoid housing with a respective inlet and a respective outlet through which air pressure and vacuum can be respectively supplied to a teat-cup milking apparatus, the first valve and second valve each comprising a solenoid valve plunger having a first end and a second end and a highly compressible damper member having a height approximately equal to the distance of plunger travel located between the first end and the second end of the solenoid valve plunger and the solenoid housing having a maximum compression set of 20%;
    a first valve control for controlling the supply of air pressure to said teat-cup milking apparatus;
    a second valve control for controlling the supply of a vacuum to said teat-cup milking apparatus;
    a common outlet operatively connected to both of said first valve and second valve through which air pressure and vacuum are alternately supplied to said teat-cup milking apparatus from said first valve and second valve, respectively; and
    control means connected to said first valve and second valve controls, said control means respectively actuating and deactivating said first valve and second valve controls to provide alternating supply of air pressure and vacuum to said common outlet, with said first valve and second valve controls never being simultaneously actuated.

* * * * *